(12) United States Patent
Conlin

(10) Patent No.: US 7,478,762 B2
(45) Date of Patent: Jan. 20, 2009

(54) THERMAL BY-PASS VALVE

(76) Inventor: Richard A. Conlin, 8940 Albany Ct., Saline, MI (US) 48176

( * ) Notice: Subject to any disclaimer, the term of this patent is extended or adjusted under 35 U.S.C. 154(b) by 529 days.

(21) Appl. No.: 11/197,479

(22) Filed: Aug. 5, 2005

(65) Prior Publication Data
US 2007/0029398 A1 Feb. 8, 2007

(51) Int. Cl.
*G05D 23/02* (2006.01)
*F16K 17/38* (2006.01)
(52) U.S. Cl. .............. 236/101 D; 236/101 R; 137/468
(58) Field of Classification Search ............. 236/93 R, 236/93 B, 101 R, 101 D, 34.5; 137/468, 137/457; 123/464
See application file for complete search history.

(56) References Cited
U.S. PATENT DOCUMENTS 3,754,706 A    8/1973  Tao
4,846,219 A    7/1989  Schaefer
5,404,972 A *  4/1995  Popjoy et al. ............... 188/277
6,499,666 B1  12/2002  Brown

FOREIGN PATENT DOCUMENTS

JP    57-146968    9/1982

* cited by examiner

Primary Examiner—Chen-Wen Jiang
(74) Attorney, Agent, or Firm—Richard C. Litman

(57) ABSTRACT

A thermal by-pass valve for fluids includes a sleeve having an inlet opening, and two outlet openings. One of the outlet openings functions as a by-pass opening. A bi-metallic metal coil is enclosed within the sleeve. The coil has one end securely attached to a cap, which cap incorporates an inlet for a fluid. The cap is attached to the inlet opening of the sleeve. The bi-metallic coil is designed to rotate the sleeve when the temperature of the fluid exceeds or drops below a designated threshold temperature.

12 Claims, 3 Drawing Sheets

THERMAL BY-PASS VALVE

BACKGROUND OF THE INVENTION

1. Field of the Invention

The present invention generally relates to devices for controlling fluid flow. More specifically, the present invention is drawn to a thermal by-pass valve assembly.

2. Description of the Related Art

In many fluid flow systems, it is necessary that the flow path is directed according to the temperature of the fluid. HVAC and drive trains are examples of systems that direct fluids based on fluid temperature. These systems require the fluid to be directed in a by-pass path when the fluid is below a certain temperature. Once a threshold temperature is attained, the fluid is then directed in a designated "working" path. The art cries out for a reliable, uncomplicated valve arrangement to accomplish this flow scenario.

The related art is replete with valve arrangements that employ a by-pass function. Examples of the aforementioned related art are cited and identified in the accompanying IDS. However, none of the cited and identified inventions and patents, taken either singly or in combination, is seen to disclose a by-pass valve arrangement as will be subsequently described and claimed in the instant invention.

SUMMARY OF THE INVENTION

The thermal by-pass valve of the instant invention comprises a sleeve having an inlet opening, and two outlet openings. One of the outlet openings functions as a by-pass opening. A bi-metallic metal coil is enclosed within the plastic sleeve. The coil has one end securely attached to a cap, which cap incorporates an inlet for a fluid. The cap is attached to the inlet opening of the sleeve. The bi-metallic coil is designed to rotate the sleeve when the temperature of a flowing fluid exceeds or drops below a designated threshold temperature. The bypass outlet opening in the sleeve will be in flow communication with a by-pass opening in the valve housing when the fluid temperature is below the threshold value. When the flow temperature reaches the threshold value, the coil causes the sleeve to rotate and close the by-pass opening and simultaneously open the other normal flow opening.

Accordingly, the instant invention presents a unique by-pass valve assembly that is simplistic in operation and reliable. The invention provides for improved elements and arrangements thereof for the purposes described which are inexpensive, dependable and fully effective in accomplishing their intended purposes.

A clear understanding of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
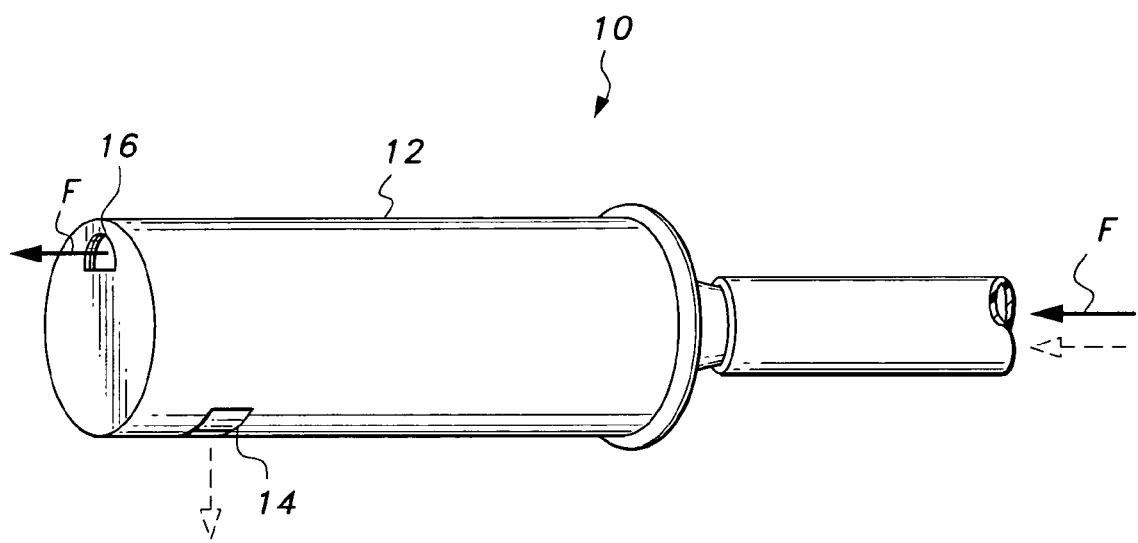
FIG. 1 is an environmental, perspective schematic of a thermal by-pass valve assembly according to the present invention.

Attention is first directed to FIG. 1 wherein the thermal by-pass valve assembly of the present invention is generally indicated at 10. The valve is disposed in the cavity of a valve housing 12. As indicated above, the housing 12 could be situated in any fluid flow system such as a drive train or HVAC. Housing 12 is arranged in a flow line for a working fluid F and is provided with a by-pass outlet 14 and an outlet 16 that directs the fluid to a desired device i.e. a cooler. Housing 12 is adapted to receive the valve 10 therein.

Figure 2:
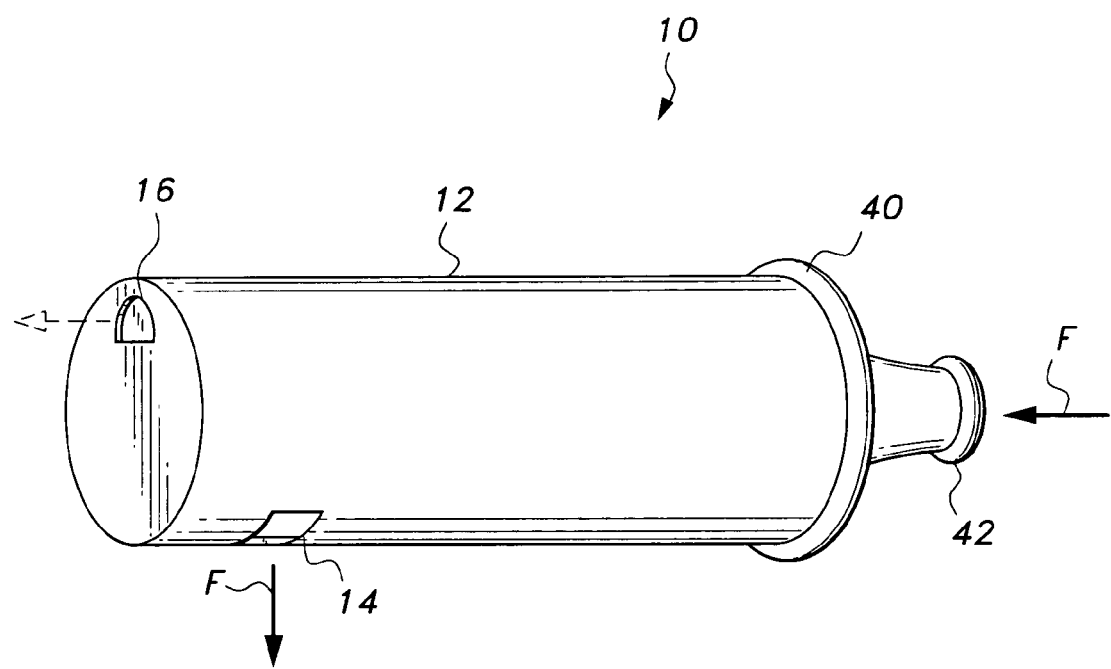
FIG. 2 is a perspective view of an assembled thermal by-pass valve according to the present invention.
Figure 3:
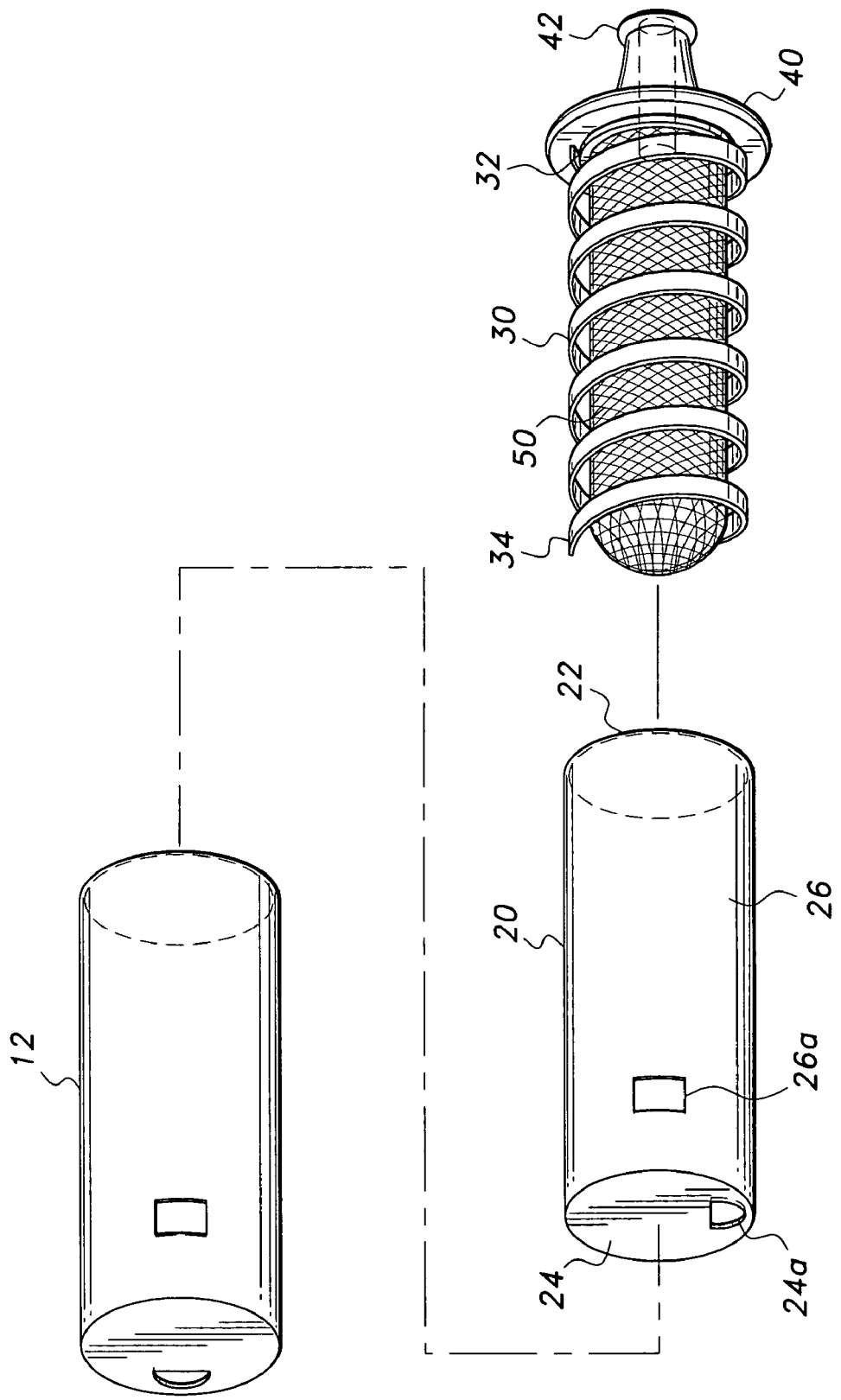
FIG. 3 is an exploded view of a by-pass valve assembly according to the present invention.

As best seen in FIGS. 2 and 3, valve 10 comprises a sleeve 20 open at an inlet end 22 to receive a bi-metal coil 30 therein. A first outlet 24a for normal flow is formed in end wall 24 of sleeve 20. A second outlet 26a for by-pass flow is formed in circumferential wall 26. Note that outlet 24a is in registration with outlet 16 (FIG. 1) when the temperature of the fluid is above a pre-designated threshold value. In FIG. 2 sleeve 20 has been rotated in housing 12 so that outlet 26a is in registration with by-pass outlet 14. The outlets 24a and 26a may both be located in the end wall or conversely, both may be located in the circumferential wall dependent on the configuration of the outlets in housing 12. Although molded plastic is preferred, it should be noted that the sleeve 20 may be fabricated from other suitable materials.

Bi-metal coil 30 is fabricated from a conventional thermostat metal composition and designed to torque at a pre-designated threshold temperature, which temperature is chosen according to intended valve use. A proximate end 32 of coil 30 is securely anchored to a cap 40. The distal end 34 of coil 30 is a free end. Cap 40 is provided with an inlet 42. Cap 40 is secured to open inlet end 22 when coil 30 is inserted in sleeve 20. If in the by-pass mode, as indicated above, when the temperature of the working fluid rises to the threshold temperature, coil 30 will torque and cause sleeve 20 to rotate. Rotation of sleeve 20 will cover by-pass outlet 14 and position outlet 24a in registration with normal flow outlet 16.

The present invention incorporates a removable filter 50, which filter is configured as a mesh sleeve. Filter 50 is designed for positioning inside coil 30 and is substantially coextensive therewith. Filter 50 is attached at one end to cap 40 such that the working fluid flows through the filter prior to contacting the coil. Filter 50 functions to filter out debris from the working fluid.

It is to be understood that the present invention is not limited to the embodiments described above, but encompasses any and all embodiments within the scope of the following claims.

I claim:

1. A thermal by-pass valve, comprising:
   a sleeve, said sleeve having an open end, a closed end and a wall defining a volume therein;
   a first fluid flow opening formed in said wall;
   a second fluid flow opening formed in said closed end;
   a bi-metal coil disposed in said volume; and
   a mesh filter positioned inside said coil.

2. The thermal by-pass valve according to claim 1, wherein said sleeve is fabricated from molded plastic.

3. The thermal by-pass valve according to claim 1, wherein said sleeve is cylindrical.

4. The thermal by-pass valve according to claim 1, including a cap member attached to said coil, wherein said cap member is disposed to cover said open end of said sleeve.

5. A thermal by-pass valve, comprising:
a sleeve, said sleeve having an open end, a closed end and a wall defining a volume therein;
a first fluid flow opening formed in said wall;
a second fluid flow opening formed in said closed end;
a bi-metal coil disposed in said volume, said bi-metal coil having a proximate end and a distal end;
a mesh filter positioned inside said coil:
a cap member secured to said sleeve and closing said open end of said sleeve, wherein said proximate end of said bi-metal coil is anchored to said cap member; and
a fluid flow passageway opening through said cap member.

6. The thermal by-pass valve according to claim 5, wherein said sleeve is fabricated from molded plastic.

7. The thermal by-pass valve according to claim 5, wherein said sleeve is cylindrical.

8. A thermal by-pass valve assembly comprising:
a valve housing, said housing having a first outlet for normal flow of a working fluid and a second outlet for by-pass flow of said working fluid;
a sleeve mounted in said housing, said sleeve rotatable from a first positioned to a second position, said sleeve having an open end, a closed end and a wall defining a volume therein;
a first fluid flow opening formed in said wall, said first fluid flow opening being in registration with said second outlet when said sleeve is in said first position;
a second fluid flow opening formed in said closed end said second fluid flow opening being in registration with said first outlet when said sleeve is in said second position; and
a bi-metal coil disposed in said volume.

9. The thermal by-pass valve according to claim 8, wherein said sleeve is fabricated from molded plastic.

10. The thermal by-pass valve according to claim 8, wherein said sleeve is cylindrical.

11. The thermal by-pass valve according to claim 8, wherein said bi-metal coil has a proximate end and a distal end;
a cap member secured to said sleeve and closing said open end of said sleeve, wherein said proximate end of said bi-metal coil is anchored to said cap member; and
a fluid flow passageway opening through said cap member.

12. The thermal by-pass valve according to claim 11, including a mesh filter positioned inside said coil.

* * * * *